(12) United States Patent
Enoki

(10) Patent No.: US 8,960,752 B2
(45) Date of Patent: Feb. 24, 2015

(54) INTERIOR DECORATIVE RESIN COMPONENT AND MOUNTING METHOD THEREOF

(75) Inventor: Ryoichi Enoki, Utsunomiya (JP)

(73) Assignee: Honda Access Corp., Niiza-shi (JP)

( * ) Notice: Subject to any disclaimer, the term of this patent is extended or adjusted under 35 U.S.C. 154(b) by 37 days.

(21) Appl. No.: 13/215,777

(22) Filed: Aug. 23, 2011

(65) Prior Publication Data

US 2012/0248806 A1    Oct. 4, 2012

(30) Foreign Application Priority Data

Mar. 29, 2011    (JP) .................................. 2011-073291

(51) Int. Cl.
*B60R 13/02*    (2006.01)
(52) U.S. Cl.
CPC ......... *B60R 13/0206* (2013.01); *B60R 13/0256* (2013.01); *B60R 2013/0287* (2013.01)
USPC ........................................ 296/1.08; 296/39.1
(58) Field of Classification Search
USPC ...................... 296/1.07–1.09, 39.1, 70, 146.7
See application file for complete search history.

(56) References Cited

U.S. PATENT DOCUMENTS

| | | | | |
|---|---|---|---|---|
| 6,394,536 | B2 * | 5/2002 | Takahara | ................... 296/187.05 |
| 6,533,343 | B2 * | 3/2003 | Bohm et al. | ............. 296/100.02 |
| 6,983,978 | B2 * | 1/2006 | Radu et al. | ................. 296/146.7 |
| 7,077,449 | B2 | 7/2006 | Tokunaga | |
| 7,216,926 | B2 * | 5/2007 | Hampel | ................... 296/190.08 |
| 7,246,817 | B2 * | 7/2007 | Tanase | ...................... 280/730.2 |
| 7,340,808 | B2 * | 3/2008 | Baekelandt | ...................... 24/453 |
| 7,517,002 | B2 * | 4/2009 | Reed et al. | ................. 296/146.7 |
| 7,530,623 | B2 * | 5/2009 | Hampel | ..................... 296/146.11 |
| 7,669,915 | B2 * | 3/2010 | Lipski | ......................... 296/146.7 |
| 2004/0245798 | A1 * | 12/2004 | Tokunaga | .................... 296/39.1 |

(Continued)

FOREIGN PATENT DOCUMENTS

| | | |
|---|---|---|
| CN | 1289337 C | 12/2006 |
| JP | 2004-58710 A | 2/2004 |

(Continued)

OTHER PUBLICATIONS

Japanese Office Action dated Feb. 19, 2013, issued in corresponding Japanese Patent Application No. 2011-073291 (2 pages).

(Continued)

*Primary Examiner* — Gregory Blankenship
(74) *Attorney, Agent, or Firm* — Westerman, Hattori, Daniels & Adrian, LLP

(57) ABSTRACT

There is provided an interior decorative resin component allowing mounting holes to be further precisely bored on a mounting portion thereof without using a pattern paper. This interior decorative resin component comprises a mounting portion to be fixed to a pocket section of an instrument panel inside a vehicle, and an auxiliary portion having a shape conformable to the pocket section with a three-dimensional shape. This interior decorative resin component can be applied to even more types of vehicles due to an improved merchantability thereof. Particularly, the interior decorative resin component is easily mounted in a sense that positioning procedures thereof are reduced by a significant degree by not using a pattern paper, thus minimizing variations in the precisions of positioning performed by each worker. Further, costs spent on the pattern paper and parts such as jigs or the like can thus be omitted to improve a profit ratio.

9 Claims, 10 Drawing Sheets

(56) References Cited

U.S. PATENT DOCUMENTS

| | | | |
|---|---|---|---|
| 2005/0253416 A1 | 11/2005 | Radu et al. | |
| 2009/0256373 A1* | 10/2009 | Fukui et al. | 296/1.08 |
| 2010/0171333 A1* | 7/2010 | Smith et al. | 296/1.08 |
| 2010/0295329 A1* | 11/2010 | Sapak et al. | 296/1.08 |
| 2012/0248806 A1* | 10/2012 | Enoki | 296/1.08 |

FOREIGN PATENT DOCUMENTS

| | | |
|---|---|---|
| JP | 2006-44350 A | 2/2006 |
| JP | 2010-064575 A | 3/2010 |
| JP | 2010-264835 A | 11/2010 |
| WO | 2010/095345 A1 | 8/2010 |

OTHER PUBLICATIONS

Chinese Office Action dated Mar. 4, 2014, issued in corresponding Chinese Patent Application No. 201110251875.5 with partial English translation (14 pages).

* cited by examiner

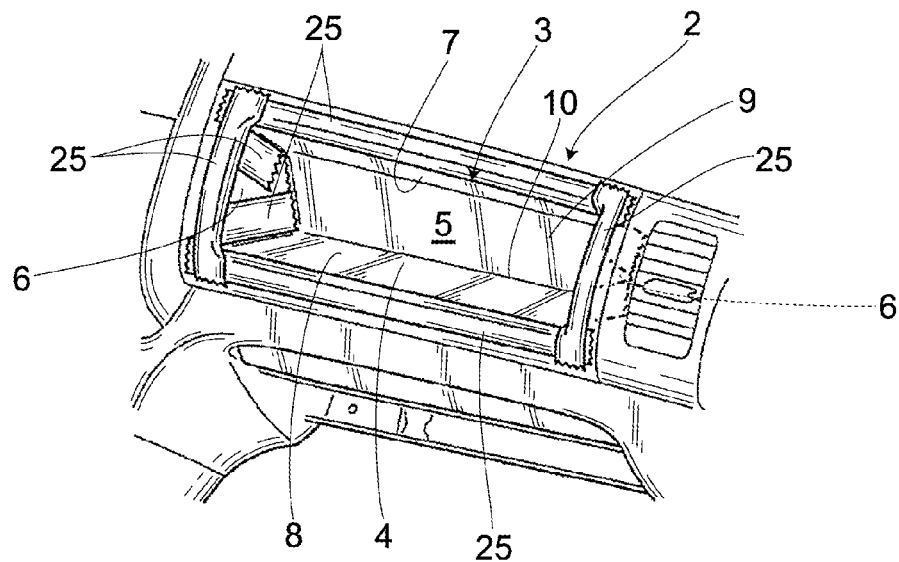
FIG.7
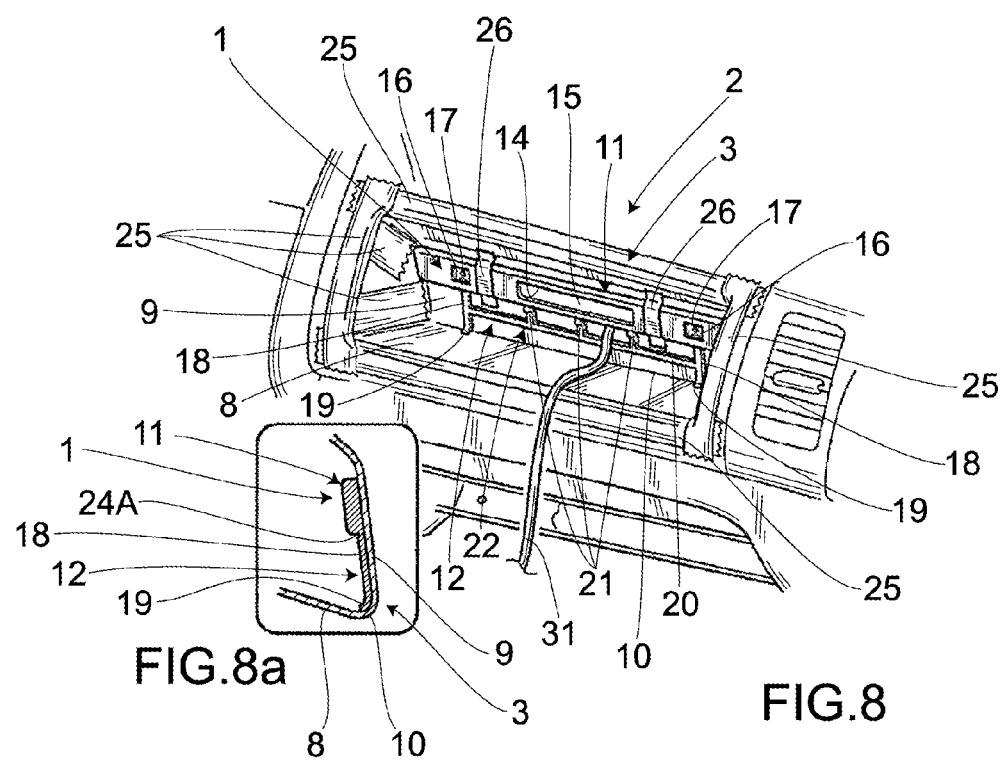
FIG.8a
FIG.8

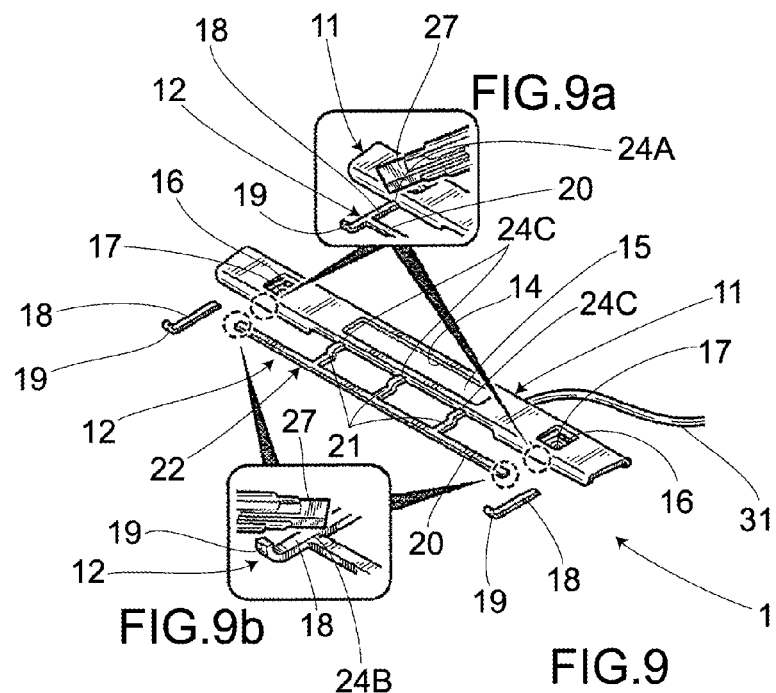
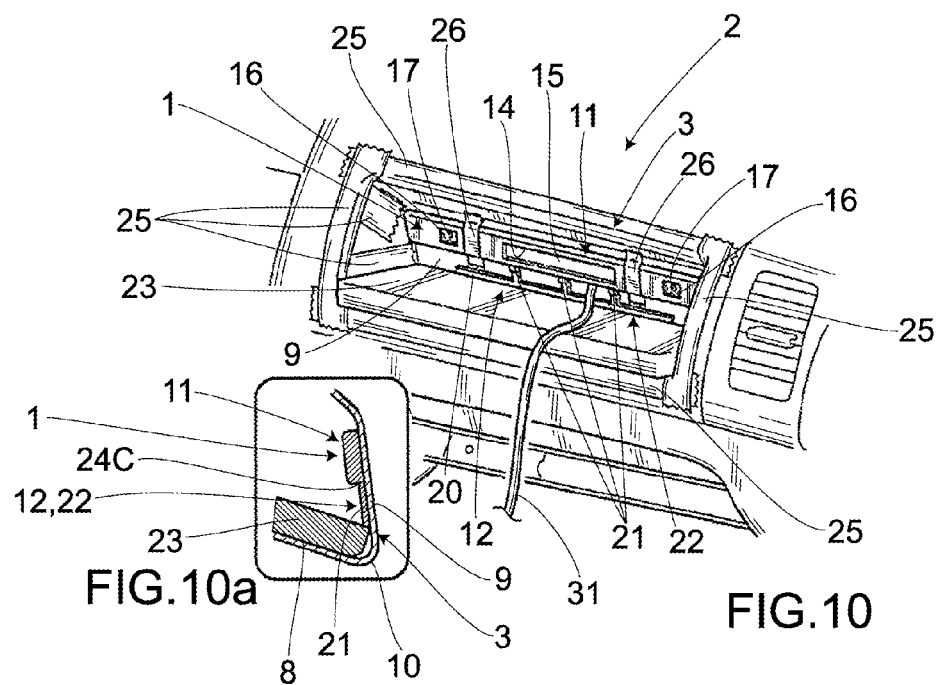

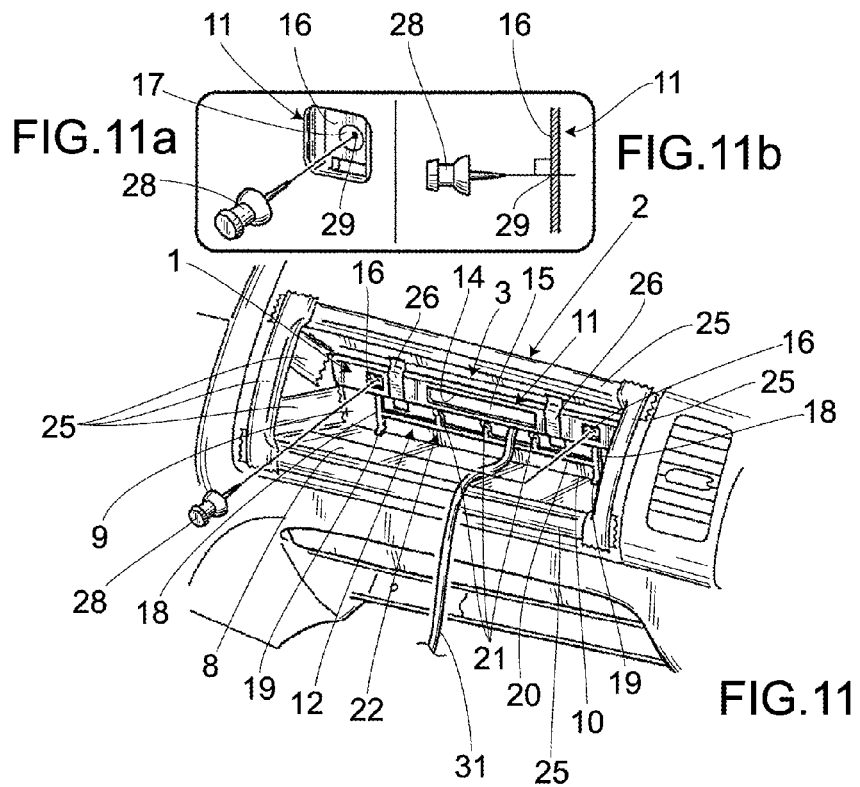
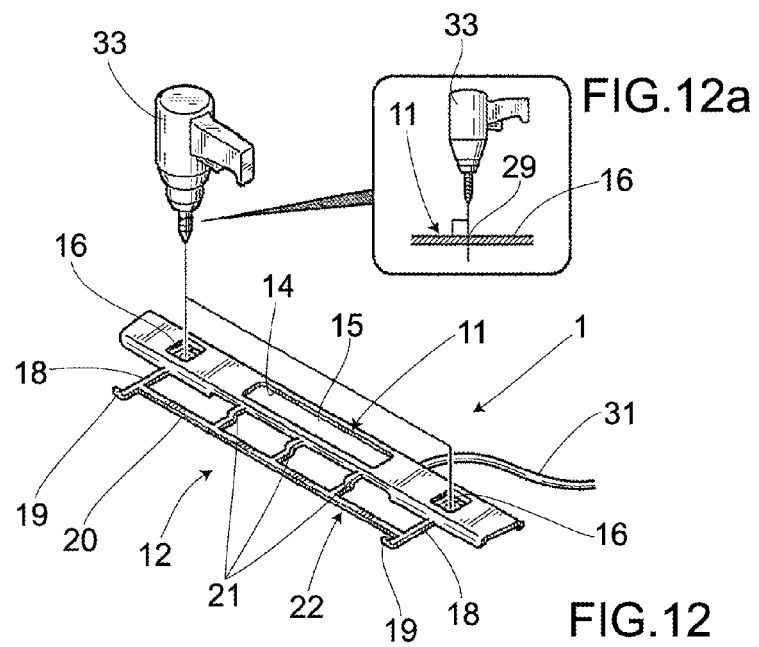

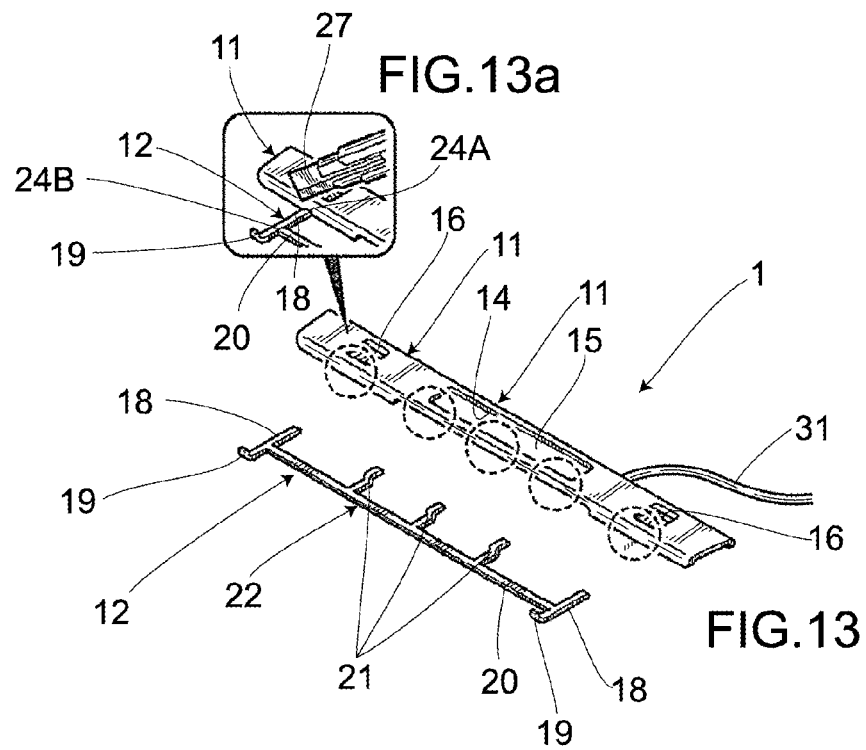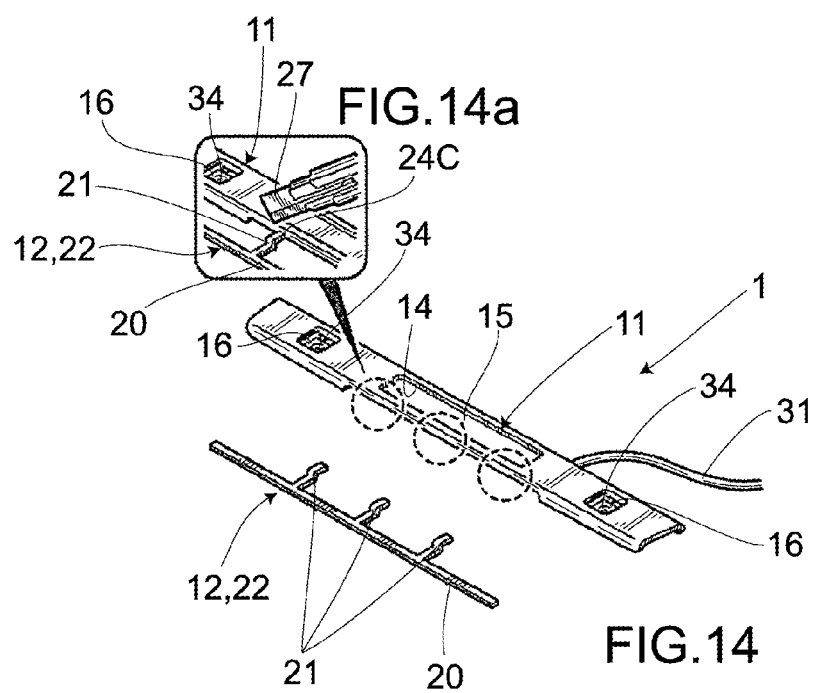

INTERIOR DECORATIVE RESIN COMPONENT AND MOUNTING METHOD THEREOF

BACKGROUND OF THE INVENTION

1. Field of the Invention

The present invention relates to an interior decorative resin component to be mounted inside a vehicle, and a mounting method thereof.

2. Description of Related Art

As a conventional interior decorative resin component, there has been disclosed, for example, a vehicle interior material disposed on a vehicle door (e.g., Japanese Unexamined Patent Application Publication No. 2010-264835). According to this interior decorative resin component, precise locations of mounting holes are determined by, for example, drawing scribe lines in advance on a back surface of a mounting surface. However, such scribe lines may not be successfully drawn for various reasons including the complexity of the shape of the aforementioned back surface. Further, the number of the procedures for dismounting parts is preferably minimized. For these reasons, there has been often employed a method for boring a mounting hole by first adjusting a piece of pattern paper to a target area, such piece of pattern paper having corners or the like thereof matched to the reference corners or the like of the target area.

However, the following problems may occur when employing a piece of pattern paper to bore a mounting hole. First of all, no reference corner is available when the target area is formed into a complex shape, thus making it difficult to perform positioning. Further, the pattern paper may be expensive depending on the manufacturer thereof, and the overall cost may thus be influenced. Furthermore, there are observed variations in mounting locations depending on each worker. Furthermore, the aforementioned target area may be limited to where the pattern paper is applicable. Furthermore, a significant number of mounting procedures is required when employing a piece of pattern paper to bore a mounting hole.

SUMMARY OF THE INVENTION

Here, in view of the aforementioned problems, it is an object of the present invention to provide an interior decorative resin component having a structure allowing mounting holes to be further precisely bored on a mounting portion thereof without using a pattern paper, even when being mounted on a vehicle interior component with a complex three-dimensional curved surface, such complex three-dimensional curved surface making it difficult for a component to be precisely mounted thereon and impossible for scribe lines to be drawn.

In order to achieve the aforementioned objective, the invention according to a first aspect comprises a mounting portion to be fixed inside a vehicle and an auxiliary portion having a shape conformable to an interior component with a three-dimensional shape.

Further, the invention according to a second aspect comprises a structure allowing the auxiliary portion to be separated from the mounting portion.

Furthermore, according to the invention described in a third aspect and a fourth aspect, the auxiliary portion is integrally molded with the mounting portion.

Furthermore, the invention according to a fifth aspect is a method for mounting an interior decorative resin component comprising a mounting portion to be fixed inside a vehicle and an auxiliary portion having a shape conformable to an interior component with a three-dimensional shape. Particularly, the method for mounting such interior decorative resin component includes: a step of positioning the interior decorative resin component to the interior component; a step of separating the auxiliary portion from the interior decorative resin component; and a step of fixing the mounting portion inside the vehicle.

Furthermore, according to the invention described in a sixth aspect, the auxiliary portion is separated from the mounting portion after being fixed together with the mounting portion to a desired location inside the vehicle.

Furthermore, according to the invention described in a seventh aspect, the auxiliary portion is separated from the mounting portion before fixing the mounting portion to the desired location inside the vehicle.

According to an interior decorative resin component described in the first aspect of the present invention, there is improved a degree of freedom in positioning the corresponding interior decorative resin component. Therefore, the merchantability thereof is improved, and the interior decorative resin component itself can thus be applied to even more types of vehicles. Particularly, the interior decorative resin component is easily positioned in a sense that the conventional positioning procedures using a pattern paper are omitted, thus significantly reducing the positioning procedures as a whole. Such reduction in the number of the positioning procedures makes it easier for a worker to complete mounting, and serves to minimize variations in the precisions of positioning performed by each worker, thus improving the precision of mounting as a whole. In addition, since there is required no pattern paper for positioning, costs spent on the pattern paper and parts such as jigs or the like can be omitted to improve a profit ratio. Namely, both the number of the parts needed and the number of the mounting procedures can thus be reduced Further, according to the interior decorative resin component described in the second aspect of the present invention, the auxiliary portion is simply separated from the mounting portion after the mounting portion is positioned to and removed from the interior component, thus simplifying the positioning procedures of the mounting portion.

Furthermore, according to the interior decorative resin component described in the third aspect of the present invention, the number of the procedures for manufacturing the same is reduced, thus reducing the number of overall procedures.

Furthermore, according to a method for mounting an interior decorative resin component described in the fourth aspect of the present invention, a degree of freedom in positioning the corresponding interior decorative resin component is improved. Therefore, the merchantability thereof is improved, and the interior decorative resin component itself can thus be applied to even more types of vehicles. Particularly, the interior decorative resin component is easily positioned in a sense that the conventional positioning procedures using a pattern paper are omitted, thus significantly reducing the positioning procedures as a whole. Such reduction in the number of the positioning procedures makes it easier for a worker to complete mounting, and serves to minimize variations in the precisions of positioning performed by each worker, thus improving the precision of mounting as a whole. In addition, since there is required no pattern paper for positioning, costs spent on the pattern paper and parts such as jigs or the like can be omitted to improve a profit ratio. Namely, both the number of the parts needed and the number of the mounting procedures can thus be reduced Furthermore, according to the method for mounting the interior decorative resin component described in the fifth aspect of the present invention, the corresponding interior decorative resin component can be positioned with a higher precision.

Furthermore, according to the method for mounting the interior decorative resin component described in the sixth aspect of the present invention, there is achieved an improved workability.

BRIEF DESCRIPTION OF THE DRAWINGS

FIG. 7 is a perspective view showing a section inside a vehicle on which the aforementioned interior decorative resin component is to be mounted.

FIG. 8 is a perspective view showing a state in which the aforementioned interior decorative resin component has been positioned inside the vehicle, in which FIG. 8a is a partially enlarged cross-sectional view thereof.

FIG. 9 is a perspective view showing a method for adjusting the auxiliary portion of the aforementioned interior decorative resin component, in which FIG. 9a and FIG. 9b are partially enlarged views showing how leg portions are removed from the aforementioned interior decorative resin component.

FIG. 10 is a perspective view showing a state in which the aforementioned interior decorative resin component has been positioned inside the vehicle after being adjusted as shown in FIG. 9, in which FIG. 10a is a partially enlarged cross-sectional view thereof.

FIG. 11 is a perspective view showing a method for leaving marks for positioning inside the vehicle with the aforementioned interior decorative resin component being positioned as shown in FIG. 8, in which FIG. 11a and FIG. 11b are respectively a partially enlarged view and a partially enlarged cross-sectional view showing how a puncture member is used to leave the marks for positioning.

FIG. 12 is a perspective view showing a method for boring fixing holes on the aforementioned interior decorative resin component, in which FIG. 12a is a partially enlarged cross-sectional view thereof.

FIG. 13 is a perspective view showing a state in which the auxiliary portion is separated from the mounting portion of the aforementioned interior decorative resin component, in which FIG. 13a is a partially enlarged view showing how the auxiliary portion is removed from the mounting portion.

FIG. 14 is a perspective view showing a state in which an adjusted auxiliary portion has been removed from the aforementioned interior decorative resin component, in which FIG. 14a is a partially enlarged view showing how the adjusted auxiliary portion is removed from the aforementioned interior decorative resin component.

DETAILED DESCRIPTION OF THE INVENTION

Figure 1:
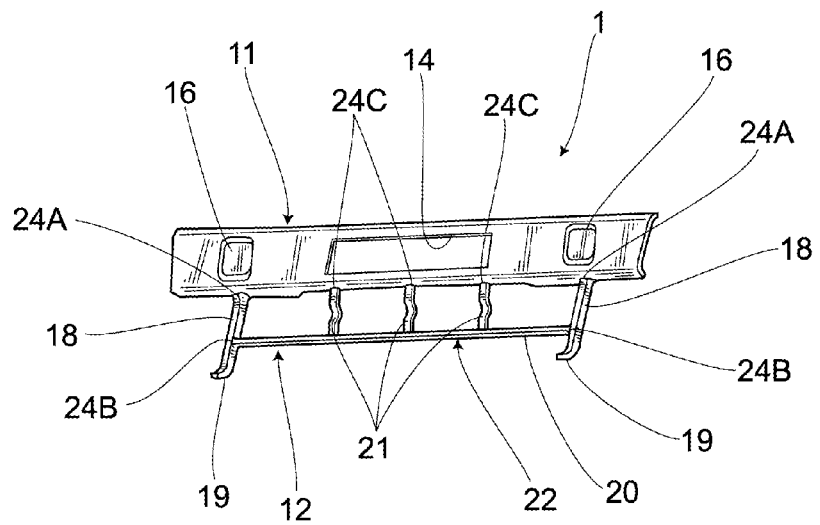
FIG. 1 is a perspective view showing an interior decorative resin component of an embodiment of the present invention.
Figure 2:
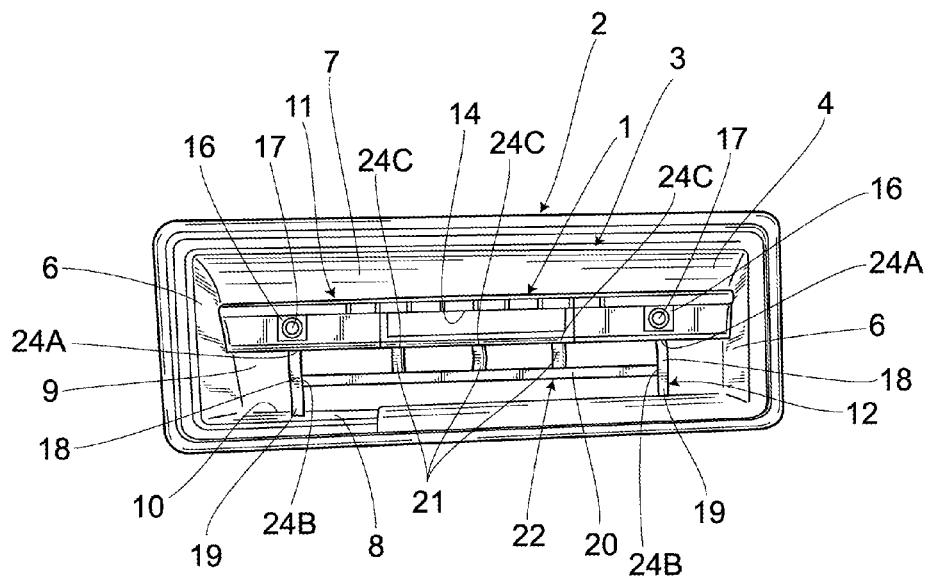
FIG. 2 is a perspective view showing a state in which the aforementioned interior decorative resin component is mounted inside a vehicle
Figure 3:
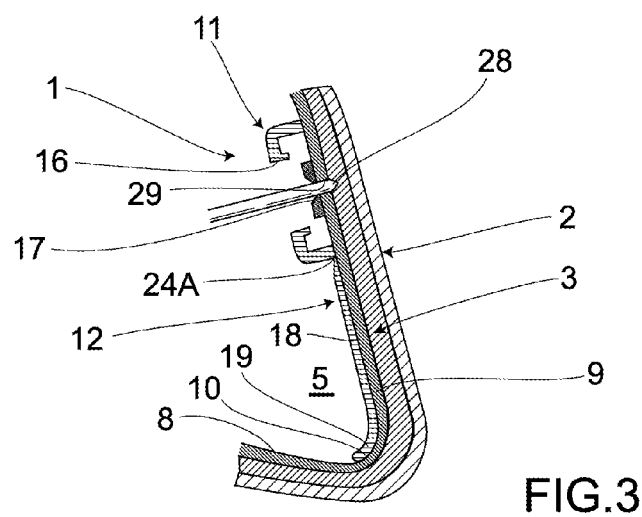
FIG. 3 is a cross sectional view of FIG. 2.
Figure 4A:
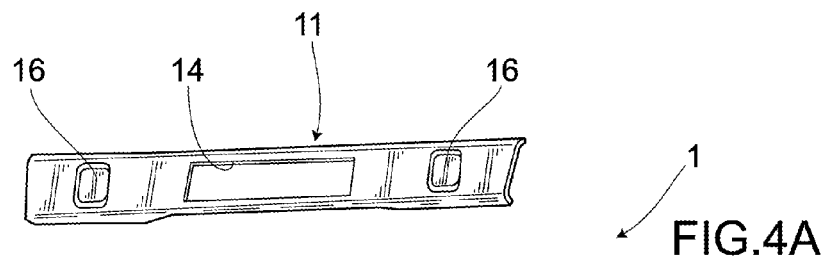
FIG. 4A is a perspective view showing a mounting portion separated from the aforementioned interior decorative resin component.
Figure 4B:
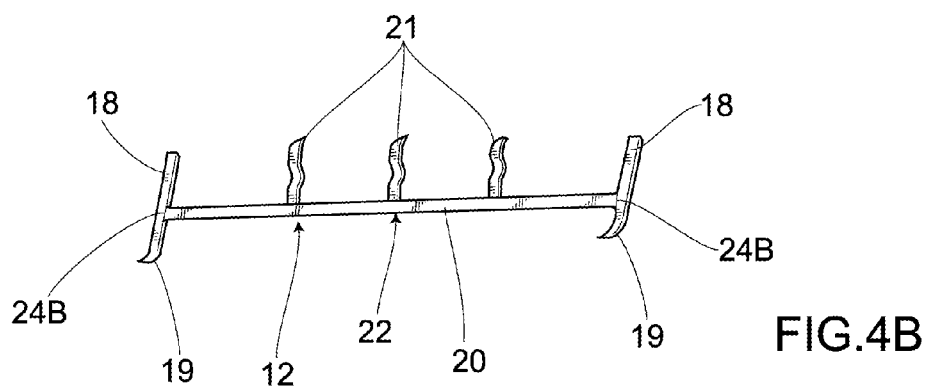
FIG. 4B is a perspective view showing an auxiliary portion separated from the aforementioned interior decorative resin component.

A preferable embodiment of the present invention is described hereunder with reference to FIG. 1 through FIG. 17.

An interior decorative resin component 1 of the present invention can be used to determine positions of vehicle interior components including: a lighting instrument such as an illumination device or the like for an instrument panel 2; lighting instruments such as illumination devices or the like for decorative panels overall inside a vehicle and the pillars; a lighting instrument such as an illumination device or the like for a speaker ring of a sound equipment inside the vehicle; a lighting instrument such as an illumination device or the like for steps located in an opening section of a vehicle door, and the like.

The present embodiment is described hereunder particularly with reference to the interior decorative resin component 1 provided for a lighting instrument such as an illumination device or the like of the instrument panel (IP) 2.

The interior decorative resin component 1 of the present embodiment is to be mounted on a pocket section 3 of the instrument panel 2 serving as an interior component disposed inside a vehicle. Particularly, the pocket section 3 is provided as a recess on the instrument panel 2, and serves as a receiving section.

More specifically, the pocket section 3 is provided with a space 5 having a bottomed rectangular column shape and a horizontal opening section 4. Here, a left-right pair of side surface sections 6 has upper and lower ends thereof communicated with an upper surface section 7 and a bottom surface section 8, respectively. Further, a back surface section 9 facing the opening section 4 has four sides thereof communicated with the upper surface section 7, the bottom surface section 8 and the two side surface sections 6. Furthermore, a boundary section between the back surface section 9 and the bottom surface section 8 is formed into a curved surface, an R section 10. Accordingly, the pocket section 3 as whole is formed into a three-dimensional shape.

The interior decorative resin component 1 comprises a mounting portion 11 to be fixed to the back surface section 9 of the pocket section 3, and a rib-shaped auxiliary portion 12 for assisting in positioning the mounting portion 11. Particularly, the auxiliary portion 12 as a whole has a shape conformable to the back surface section 9 and the R section 10 of the pocket section 3 serving as the interior component with the three-dimensional shape. Actually, the interior decorative resin component 1 is a single-piece resin product obtained by casting together the mounting portion 11 and the auxiliary portion 12 through a mold 13 shown in FIG. 5. Here, the auxiliary portion 12 is so provided with respect to the entire interior decorative resin component 1, that the overall usability of the interior decorative resin component 1 mounted is not affected.

The mounting portion 11 is made of a board member having, substantially, a rectangular shape when viewed from the top. A lighting instrument 15 is attached through a rectangular through hole section 14 provided in a mid-section of the aforementioned board member.

Further, recessed areas 16 used for positioning are provided on both sides of the through hole section 14 of the mounting portion 11. Each one of the recessed areas 16 further has a thin-walled marking section 17 formed by thinning the board member toward the center of the recessed area 16.

The auxiliary portion 12 has a pair of leg portions 18 extended substantially vertically from a side of the mounting portion 11. A front end portion 19 of each one of the leg portions 18 is formed into a shape conformable to the R section 10. More specifically, the front end portion 19 is formed into a curved shape with a curvature substantially as same as that of the R section 10.

The auxiliary portion 12 further has a transverse pole member 20 provided between the leg portions 18 and arranged in parallel with the side of the mounting portion 11, and a ladder-shaped grate body 22 composed of a plurality of vertical pole members 21, such vertical pole members 21 being provided between the transverse pole member 20 and the mounting portion 11 and arranged in parallel with the leg portions 18.

Here, the grate body 22 is so large that the auxiliary portion 12 is allowed to abut against an upper portion of an instrument panel mat member 23 disposed on the bottom surface section 8 of the pocket section 3 and having a given thickness, when positioning the interior decorative resin component 1 to the pocket section 3

Further, the shape of a surface of the interior decorative resin component 1 as a whole ranging from the mounting portion 11 to the auxiliary portion 12, is formed into a shape conformable to the three dimensional surface shape of the pocket section 3 ranging from the back surface section 9 to the R section 10.

Furthermore, connecting portions of the mounting portion 11 and the leg portions 18, connecting portions of the leg portions 18 and the transverse pole member 20 and connecting portions of the mounting portion 11 and the vertical pole members 21, are respectively provided with thin-walled separation sections 24A, 24B and 24C that are formed into wedge-shaped recesses.

Furthermore, the auxiliary portion 12 is formed thinner than the mounting portion 11, and a cutting instrument 27 such as a cutter knife or the like can be used to cut sections other than the thin-walled separation sections 24A, 24B, 24C of the auxiliary portion 12, depending on a shape of a component other than the mat member 23 in the pocket section 3. In this way, the interior decorative resin component 1 can be turned into a shape conformable to the three-dimensional shape of the pocket section 3.

There is described hereunder a method for mounting the interior decorative resin component 1 having the aforementioned structure.

Figure 5:
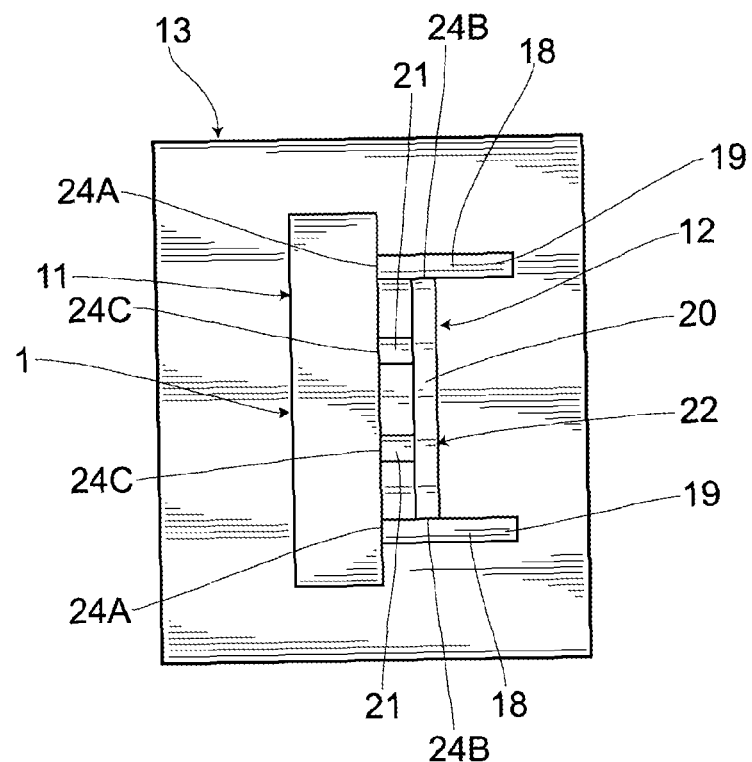
FIG. 5 is a top view of a mold of the aforementioned interior decorative resin component.

In the beginning, the mold 13 shown in FIG. 5 is used to mold the interior decorative resin component 1 designed as a single-piece component composed of the mounting portion 11 and the auxiliary portion 12. Particularly, the auxiliary portion 12 is formed into the shape matched to the back surface section 9 and the curved surface of the R section 10 in the pocket section 3.

There are described hereunder procedures for mounting the interior decorative resin component 1 on the pocket section 3 of the instrument panel 2 shown in FIG. 7.

As a preparation, an adhesive tape 25, for example, is applied inside and outside the pocket section 3 in advance, for preventing the same from being scratched.

As shown in FIG. 8 and FIG. 8a, the mounting portion 11 of the interior decorative resin component 1 is then positioned to the pocket section 3 so as to be mounted on a specific location therein, followed by using a fixing member 26 such as a masking tape or the like to fix the interior decorative resin component 1 to the pocket section 3.

Specifically, the interior decorative resin component 1 shown in FIG. 8 and FIG. 8a is so positioned to the pocket section 3 that the mounting portion 11 and the auxiliary portion 12 abut against the back surface section 9, and that the front end portions 19 of the leg portions 18 of the auxiliary portion 12 abut against the R section 10.

Further, when there is provided the mat member 23 in the pocket section 3, the cutting instrument 27 such as a cutter knife or the like is used to cut four thin-walled separation sections including 24A and 24B of the auxiliary portion 12 of the interior decorative resin component 1, thus separating the leg portions 18 from the interior decorative resin component 1 (FIG. 9, FIG. 9a and FIG. 9b).

As shown in FIG. 10 and FIG. 10a, the interior decorative resin component 1 without the leg portions 18 is then positioned to the pocket section 3 provided with the mat member 23, so to be mounted on a specific location in the pocket section 3. Subsequently, the fixing member 26 such as a masking tape or the like is used to fix the interior decorative resin component 1 to the pocket section 3.

Here, as shown in FIG. 10 and FIG. 10a, the interior decorative resin component 1 is so positioned to the pocket section 3 provided with the mat member 23, that the mounting portion 11 and the auxiliary portion 12 abut against the back surface section 9, and that the transverse pole member 20 of the grate body 22 of the auxiliary portion 12 abuts against the upper portion of the mat member 23.

Figure 6:
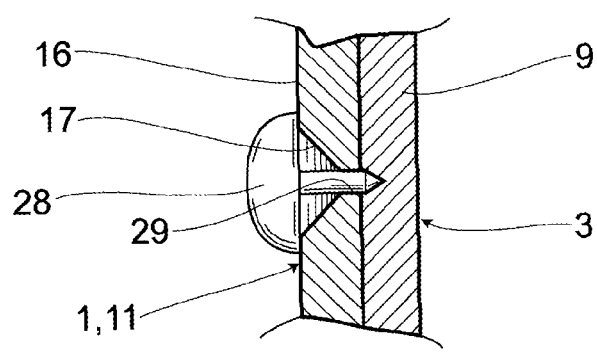
FIG. 6 is a cross sectional view showing a vicinity of the mounting portion when the aforementioned interior decorative resin component has been positioned.

With the interior decorative resin component 1 being positioned as well as fixed to the pocket section 3 as shown in FIG. 8, FIG. 8a, FIG. 10 and FIG. 10a, a puncture member 28 with a sharp front end, such as a pushpin or the like is used to puncture the center of the thin-walled marking section 17 of each recessed area 16 (FIG. 6). As a result, the puncture member 28 introduced through a hole 29 of the thin-walled marking section 17 is eventually stuck into the back surface section 9 at two locations corresponding to each recessed area 16, thus leaving two recessed marks (marking) for positioning (FIG. 11, FIG. 11a and FIG. 11b). Here, it is preferred that the puncture member 28 is vertically stuck into the back surface section 9 so as to improve the precisions of the aforementioned marks for positioning.

After leaving the marks for positioning on the back surface section 9 of the pocket section 3, the fixing member 26 is removed so as to allow the interior decorative resin component 1 to be removed from the pocket section 3.

Next, a boring instrument 33 such as an awl, a drill or the like is used to bore fixing holes 30 on the two marks for positioning of the back surface section 9 of the pocket section 3, such fixing holes 30 allowing later described male screw members 35 to be screwed thereinto. In addition, using the boring instrument 33, there is also bored on a given location of the back surface section 9 a wiring hole 32 for passing a wiring cord 31 of the lighting instrument therethrough.

The boring instrument 33 such as an awl, a drill or the like is further used to expand a diameter of the hole 29 formed by allowing the puncture member 28 to penetrate the thin-walled marking section 17. Specifically, the hole 29 has its diameter expanded to the extent that a shank of each one of the later described male screw members 35 can be inserted therethrough, thus turning the hole 29 into an insertion hole 34. Here, it is preferred that the boring instrument 33 is vertically stuck into the surface of the mounting portion 11 so as to improve the precision of the aforementioned insertion hole.

As shown in FIG. 13 and FIG. 13a, the cutting instrument 27 such as a cutter knife or the like is then used to cut five thin-walled separation sections 24A, 24C, such thin-walled separation sections, as mentioned earlier, being located on the connecting portions of the mounting portion 11 and the leg portions 18 and on the connecting portions of the mounting portion 11 and the vertical pole members 21. As a result, the auxiliary portion 12 is separated from the mounting portion 11 and discarded thereafter.

Further, as shown in FIG. 14 and FIG. 14a, when there is provided the mat member 23 in the pocket section 3, the cutting instrument 27 such as a cutter knife or the like is then used to cut three thin-walled separation sections 24C located on the connection portions of the mounting portion 11 and the vertical pole members 21. As a result, the auxiliary portion 12 is separated from the mounting portion 11 and discarded thereafter. Here, as shown in FIG. 13, FIG. 13a, FIG. 14 and FIG. 14a, a surface at which the auxiliary portion 12 is cut off from the mounting portion 11 is usually not visible through the opening section 4.

Figure 15:
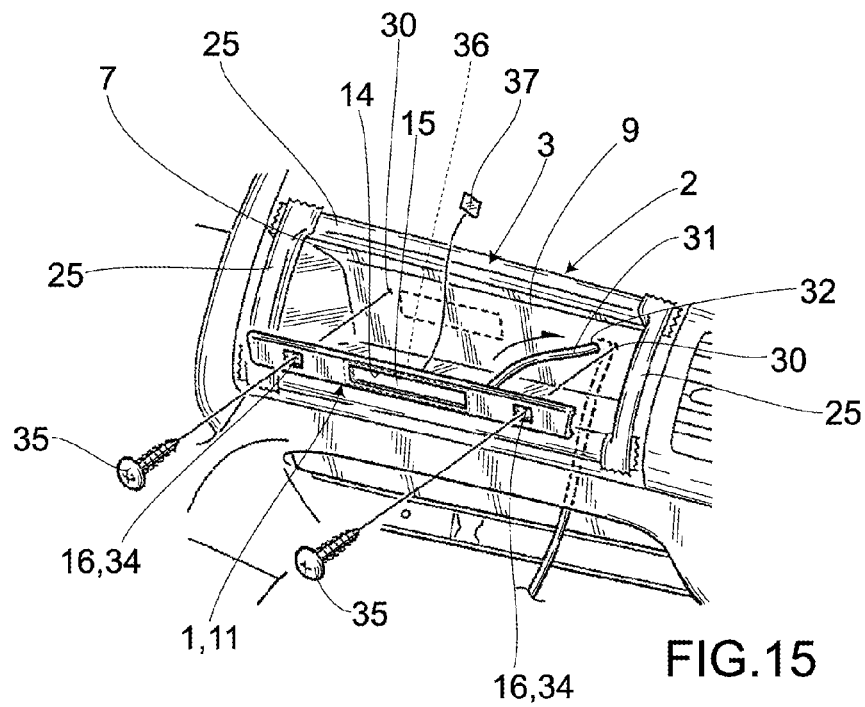
FIG. 15 is a perspective view showing a method for mounting the aforementioned interior decorative resin component inside the vehicle.

Next, the adhesive tape 25 is removed from the pocket section 3. Subsequently, as shown in FIG. 15, there are carried out the following procedures with respect to the interior decorative resin component 1 now composed of only the mounting portion 11 due to the removal of the auxiliary portion 12. The wiring cord 31 of the lighting instrument 15 is passed through the wiring hole 32 of the pocket section 3. Further, each one of the male screw members 35 such as screws or the like is screwed into each fixing hole 30 through the insertion hole 34. Furthermore, a release sheet 37 is stripped off a double-stick tape 36 adhered to a fixing surface of the mounting portion 11. In this way, the interior decorative resin component 1 is mounted on the back surface section 9 of the pocket section 3 by means of the male screw members 35 and the double-stick tape 36. Eventually, an area of the mounting portion 11 to which the double-stick tape 36 is adhered is pressed sufficiently, thereby completing fixing the interior decorative resin component 1 to the back surface section 9 of the pocket section 3.

In this way, the present embodiment according to aspect 1 is composed of the mounting portion 11 to be fixed to the pocket section 3 of the instrument panel 2 inside the vehicle, and the auxiliary portion 12 having the shape conformable to the pocket section 3 provided as an interior component with a three-dimensional shape.

In this case, a degree of freedom in positioning the interior decorative resin component 1 is improved. Therefore, the merchantability thereof is improved, and the interior decorative resin component 1 itself can thus be applied to even more types of vehicles. Particularly, the interior decorative resin component 1 is easily positioned in a sense that the conventional positioning procedures using a pattern paper are omitted, thus significantly reducing the positioning procedures as a whole. Such reduction in the number of the positioning procedures makes it easier for a worker to complete mounting, and serves to minimize variations in the precisions of positioning performed by each worker, thus improving the precision of mounting as a whole. In addition, since there is required no pattern paper for positioning, costs spent on the pattern paper and parts such as jigs or the like can be omitted to improve a profit ratio. Namely, both the number of the parts needed and the number of the mounting procedures can thus be reduced Further, the present embodiment according to aspect 2 has a structure allowing the auxiliary portion 12 to be separated from the mounting portion 11. Particularly, the auxiliary portion 12 is simply separated from the mounting portion 11 after the mounting portion 11 is positioned to and removed from the pocket section 3, thus simplifying the positioning procedures of the mounting portion 11.

Furthermore, according to the present embodiment set forth in aspect 3 and aspect 4, the auxiliary portion 12 is integrally molded with the mounting portion 11, thereby reducing the number of the procedures for manufacturing the interior decorative resin component 1.

Furthermore, according to the present embodiment set forth in aspect 5, there is provided a method for mounting the interior decorative resin component 1 composed of the mounting portion 11 to be fixed to the pocket section 3 of the instrument panel 2 inside the vehicle, and the auxiliary portion 12 having the shape conformable to the pocket section 3 provided as an interior component with a three-dimensional shape. Particularly, the method for mounting the interior decorative resin component 1 successively comprises: the step of positioning the interior decorative resin component 1 to the pocket section 3; the step of separating the auxiliary portion 12 from the interior decorative resin component 1; and the step of fixing the mounting portion 11 to the pocket section 3 of the instrument panel 2 inside the vehicle.

Figure 18:
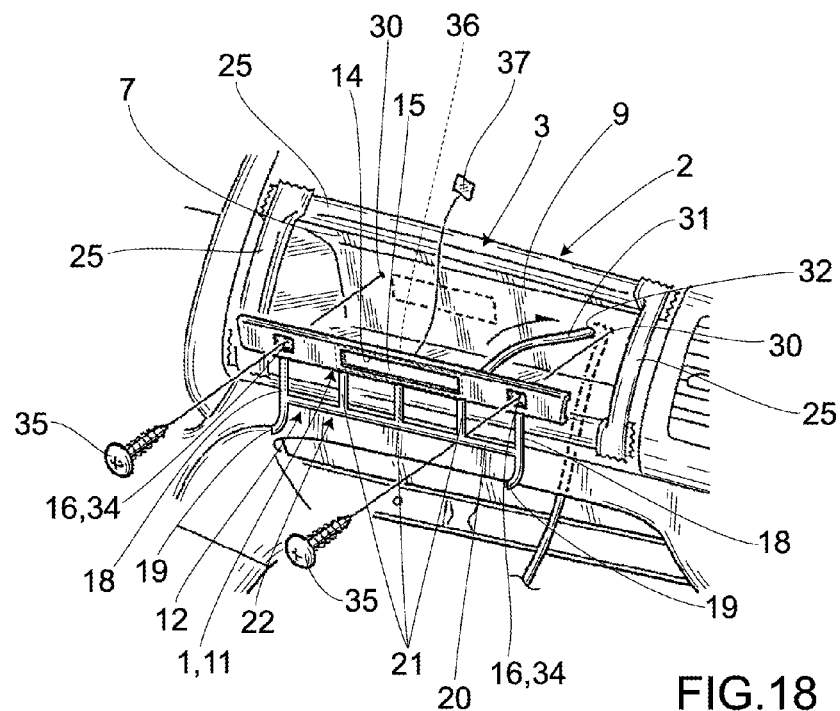
FIG. 18 is a perspective view showing a method for mounting the aforementioned interior decorative resin component comprising the auxiliary portion inside the vehicle.
Figure 19:
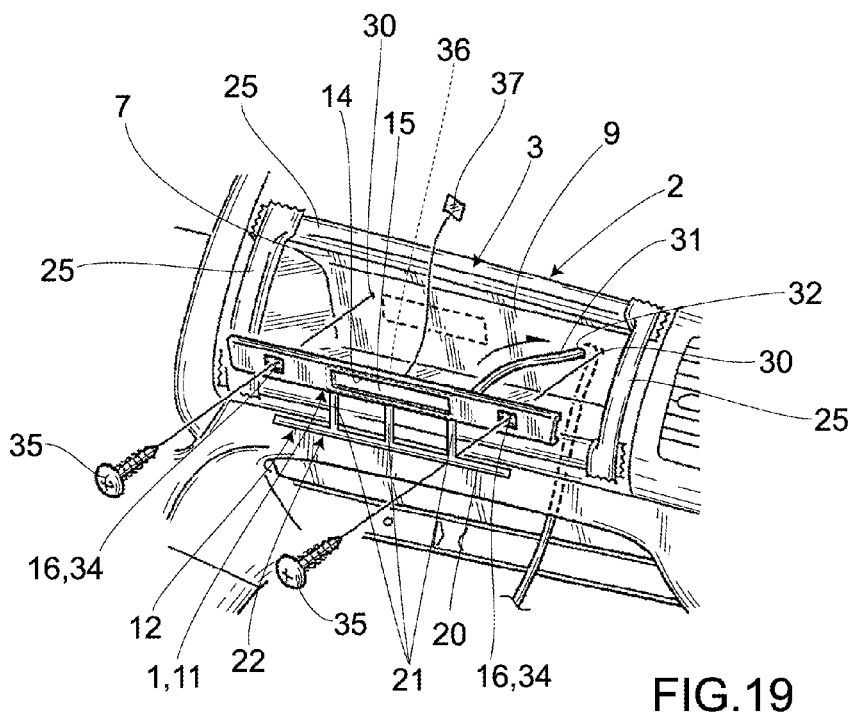
FIG. 19 is a perspective view showing a method for mounting the aforementioned interior decorative resin component comprising the adjusted auxiliary portion inside the vehicle.
Figure 20:
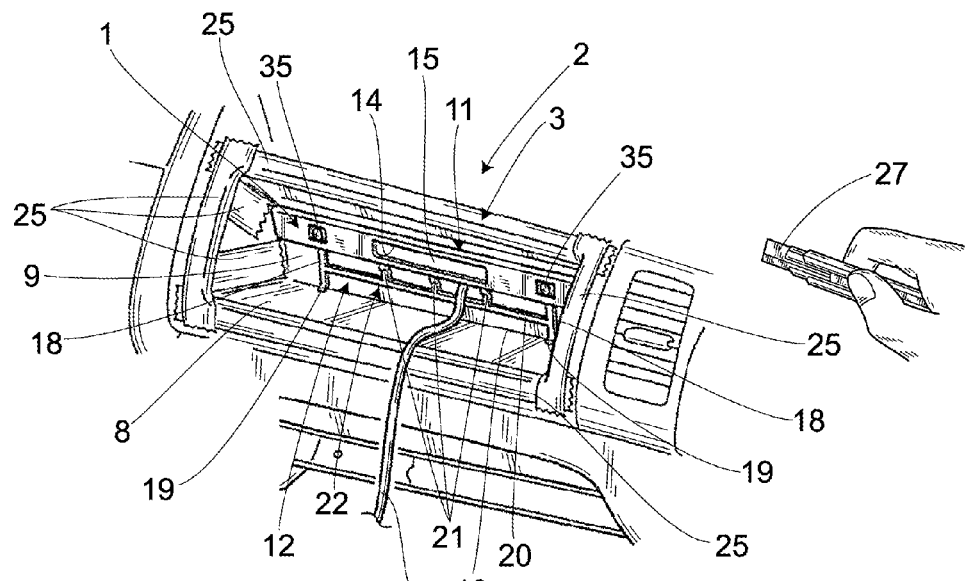
FIG. 20 is a perspective view showing a state in which a cutting instrument is provided for use in the method shown in FIG. 18.
Figure 21:
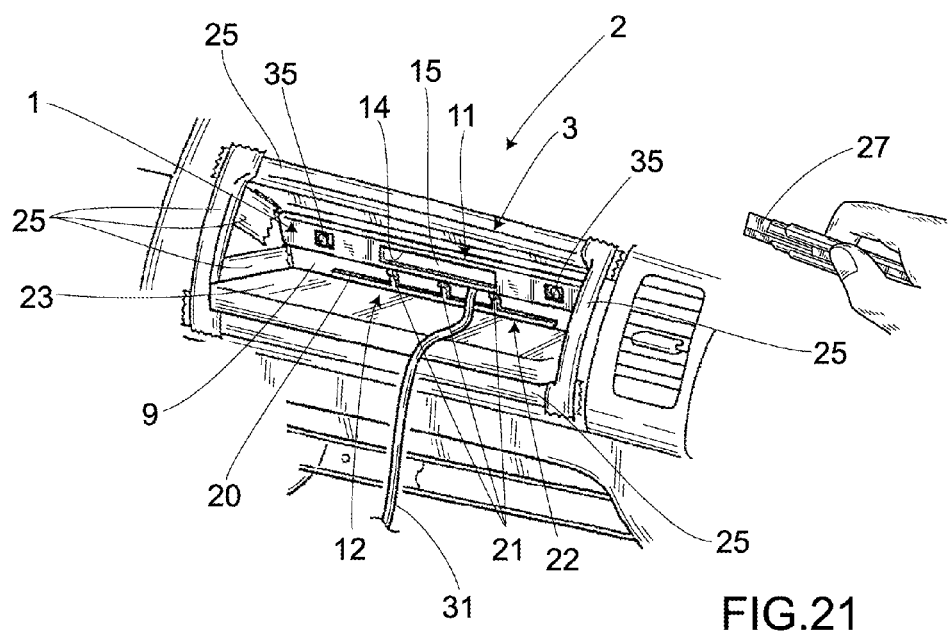
FIG. 21 is a perspective view showing a state in which the cutting instrument is provided for use in the method shown in FIG. 19.

In this case, the degree of freedom in positioning the interior decorative resin component 1 is improved. Therefore, the merchantability thereof is improved, and the interior decorative resin component 1 itself can thus be applied to even more types of vehicles. Particularly, the interior decorative resin component 1 is easily positioned in the sense that the conventional positioning procedures using a pattern paper are omitted, thus significantly reducing the positioning procedures as a whole. Such reduction in the number of the positioning procedures makes it easier for a worker to complete mounting, and serves to minimize variations in the precisions of positioning performed by each worker, thus improving the precision of mounting as a whole. In addition, since there is required no pattern paper for positioning, costs spent on the pattern paper and parts such as jigs or the like can be omitted to improve a profit ratio. Namely, both the number of the parts needed and the number of the mounting procedures can thus be reduced Further, according to the present embodiment, the interior decorative resin component 1 is positioned through the procedures shown in FIG. 8 through FIG. 12. Subsequently, as shown in FIG. 18 and FIG. 19, the wiring cord 31 of the lighting instrument 15 is passed through the wiring hole 32 of the pocket section 3, the male screw members 35 such as screws or the like are screwed into the fixing holes 30 through the insertion holes 34, and the release sheet 37 is then stripped off the double-stick tape 36 adhered to the fixing surface of the mounting portion 11. In this way, the interior decorative resin component 1 still comprising the auxiliary portion 12 is allowed to be mounted on the back surface section 9 of the pocket section 3 by means of the male screw members 35 and the double-stick tape 36. Next, the area of the mounting portion 11 to which the double-stick tape 36 is adhered is pressed sufficiently so as to complete fixing the interior decorative resin component 1 to the back surface section 9 of the pocket section 3. Subsequently, as shown in FIG. 20 as well as FIG. 13, the cutting instrument 27 such as a cutter knife or the like is provided to cut the five thin-walled separation sections 24A, 24C, such thin-walled separation sections, as mentioned earlier, being located on the connecting portions of the mounting portion 11 and the leg portions 18 and on the connecting portions of the mounting portion 11 and the vertical pole members 21. Alternatively, as shown in FIG. 21 as well as FIG. 14, the cutting instrument 27 may be used to cut three thin-walled separation sections 24C located on the connection portions of the mounting portion 11 and the vertical pole members 21. Either way, the auxiliary portion 12 is thus separated from the mounting portion 11 and discarded thereafter, thus completing mounting the interior decorative resin component 1 on the back surface section 9 of the pocket section 3. Furthermore, according to the present embodiment set forth in aspect 6, the auxiliary portion 12 is removed from the interior decorative resin component 1 after being fixed along with the mounting portion 11 to the pocket section 3 which is a desired location inside the vehicle, thus allowing the interior decorative resin component 1 to be positioned with a higher precision.

Furthermore, according to the present embodiment set forth in aspect 7, the auxiliary portion 12 is removed from the interior decorative resin component 1 before the mounting portion 11 is fixed to the pocket section 3 which is the desired location inside the vehicle, thus improving the workability of the operation for mounting the interior decorative resin component 1.

Figure 16:
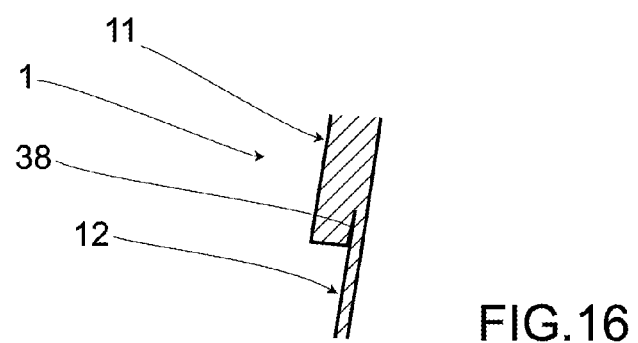
FIG. 16 is a cross sectional view showing a connecting portion of a mounting portion and an auxiliary portion of an interior decorative resin component of another embodiment.
Figure 17:
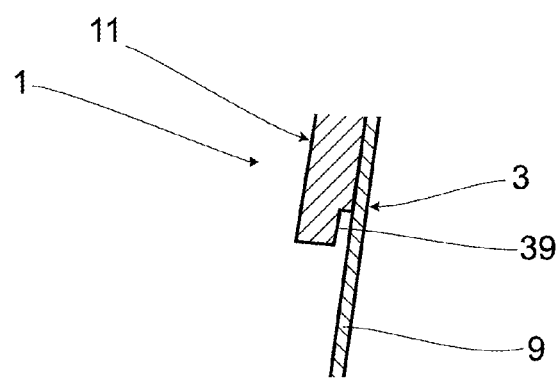
FIG. 17 is a cross sectional view showing a state in which the auxiliary portion of the embodiment shown in FIG. 16 has been removed.

Furthermore, as a modified embodiment of the mechanism separating the auxiliary portion 12 from the mounting portion 11, there can be employed the following mechanism as a substitute for the thin-walled separation sections 24A, as shown in FIG. 16 and FIG. 17. Particularly, there can be provided a slit 38 on a boundary section between the mounting portion 11 and the auxiliary portion 12. More specifically, such slit 38 is provided as a cut parallel with the back surface section 9 and extended from the corresponding boundary section into the mounting portion 11. In this sense, the auxiliary portion 12 can be separated from the mounting portion 11, starting from the slit 38. Here, a section at which the auxiliary portion 12 is separated from the mounting portion 11 later becomes a cutout 39 invisible through the opening section 4, thus not impairing the aesthetic appearance of the interior decorative resin component 1 mounted.

However, the present invention is not limited to the present embodiment. As a matter of fact, various modified embodiments are possible within the scope of the gist of the present invention. For example, according to the present embodiment, the auxiliary portion 12 of the interior decorative resin component 1 is formed into the curved shape serving as a shape conformable to the three-dimensional shape of the R section 10 formed on the boundary section between the back surface section 9 and the bottom surface section 8, such back surface section 9 being provided as a mounting surface. However, the present invention is not limited to such configuration. Actually, the auxiliary portion 12 can also be formed into other types of shapes conformable to the three-dimensional shape of the mounting surface, such types of shapes including a convex portion engageable with a concave portion of the mounting surface, a concave portion engageable with a convex portion of the mounting surface, or the like. Further, appropriate modifications can be made in the locations as well as the number of the thin-walled separation sections through which the auxiliary portion 12 is separated from the mounting portion 11.

What is claimed:

1. A method for mounting an interior decorative resin component including a decorative mounting portion to be fixed inside a vehicle, an auxiliary portion having a three-dimensional shape conformable to an interior component of the vehicle and assisting in positioning of said decorative mounting portion inside said vehicle, and at least one thin-walled separation section which separates said auxiliary portion from said decorative mounting portion and is provided on at least one connecting portion which connects said decorative mounting portion and said auxiliary portion, the method comprising the steps of:
    positioning said interior decorative resin component to said interior component of said vehicle using said auxiliary portion;
    making marks in said interior component of said vehicle based on a position of said interior decorative resin component;
    fixing said decorative mounting portion and said auxiliary portion inside said vehicle on said interior component; and then
    separating said auxiliary portion from said decorative mounting portion at said at least one thin-walled separation section.

2. An interior decorative resin component, comprising:
    a decorative mounting portion, and
    an auxiliary portion coupled with said decorative mounting portion through at least one connecting portion;
    wherein said at least one connecting portion includes a thin-walled separation section for separating said auxiliary portion from said decorative mounting portion, said thin-walled separation section being thinner than said auxiliary portion, in cross-section,
    wherein said auxiliary portion is capable of being cut and separated from said decorative mounting portion at said thin-walled separation section of said at least one connecting portion, the auxiliary portion having a three-dimensional shape conformable to an interior component of a vehicle and assisting in positioning of said decorative mounting portion inside said vehicle,
    wherein said decorative mounting portion is a board member having a substantially rectangular shape when viewed from the top, and has at least one recessed area, and
    wherein said at least one recessed area has a thin-walled marking section which is thinner than said board member toward a center of said recessed area.

3. An interior decorative resin component, comprising:
    a decorative mounting portion, and
    an auxiliary portion coupled with said decorative mounting portion through at least one connecting portion;
    wherein said at least one connecting portion includes a thin-walled separation section for separating said auxiliary portion from said decorative mounting portion, said thin-walled separation section being thinner than said auxiliary portion, in cross-section,
    wherein said auxiliary portion is capable of being cut and separated from said decorative mounting portion at said thin-walled separation section of said at least one connecting portion, the auxiliary portion having a three-dimensional shape conformable to an interior component of a vehicle and assisting in positioning of said decorative mounting portion inside said vehicle, and
    wherein said auxiliary portion is rib-shaped.

4. The interior decorative resin component according to claim 3, wherein said auxiliary portion has a pair of leg portions extending substantially vertically from a side of said decorative mounting portion.

5. The interior decorative resin component according to claim 4, wherein said auxiliary portion has a ladder-shaped grate body including:
- a transverse pole member provided between said leg portions and arranged in parallel with, and distant from, said side of said decorative mounting portion; and
- a plurality of vertical pole members provided between said transverse pole member and said decorative mounting portion and in parallel with said leg portions.

6. The interior decorative resin component according to claim 5,
- wherein a plurality of said connecting portions are provided between said decorative mounting portion and said leg portions of said auxiliary portion,
- wherein the plurality of said connecting portions connect said leg portions and said transverse pole member, and
- wherein the plurality of said connecting portions connect said decorative mounting portion and said vertical pole members.

7. A method for mounting an interior decorative resin component including a decorative mounting portion to be fixed inside a vehicle, an auxiliary portion having a three-dimensional shape conformable to an interior component of the vehicle and assisting in positioning of said decorative mounting portion inside said vehicle, and at least one thin-walled separation section which separates said auxiliary portion from said decorative mounting portion and is provided on at least one connecting portion which connects said decorative mounting portion and said auxiliary portion, the method comprising the steps of:
- positioning said interior decorative resin component to said interior component of said vehicle using said auxiliary portion;
- making marks in said interior component of said vehicle based on a position of said interior decorative resin component;
- separating said auxiliary portion from said decorative mounting portion; and
- fixing said decorative mounting portion inside said vehicle on said interior component.

8. The method for mounting the interior decorative resin component according to claim 7, wherein said auxiliary portion is separated from said decorative mounting portion before fixing said decorative mounting portion to said interior component of said vehicle.

9. The method for mounting the interior decorative resin component according to claim 7, wherein, when performing said step of positioning, a portion of said auxiliary portion is separated from a remainder of said auxiliary portion at a plurality of said thin-walled separation sections provided on said auxiliary portion.

\* \* \* \* \*